United States Patent [19]

Hau et al.

[11] Patent Number: 5,137,682
[45] Date of Patent: Aug. 11, 1992

[54] ANTIEJECT DEVICE FOR CONTROL MEMBERS OF NUCLEAR REACTORS

[75] Inventors: Gerhard Hau, Fürth; Werner Meier, Kunreuth; Helmut Moldaschl, Neunkirchen; Peter Rau, Leutenbach; Rainer Huber, Kaisheim; Anton Kautetzky, Forchheim; Jörg Tschemernjak, Munich, all of Fed. Rep. of Germany

[73] Assignee: Siemens Aktiengesellschaft, Munich, Fed. Rep. of Germany

[21] Appl. No.: 617,876

[22] Filed: Nov. 26, 1990

[30] Foreign Application Priority Data

May 25, 1988 [DE] Fed. Rep. of Germany ....... 3817655
May 22, 1989 [EP] European Pat. Off. ............. PCT/EP89/00562

[51] Int. Cl.$^5$ .................................................. G21C 7/10
[52] U.S. Cl. ...................................... 376/235; 376/242
[58] Field of Search ............... 376/235, 242, 233, 236, 376/336, 337

[56] References Cited

U.S. PATENT DOCUMENTS

| 3,408,101 | 10/1968 | Savary | 294/86.5 |
| 3,941,653 | 3/1976 | Thorp | 371/235 |
| 4,090,917 | 5/1978 | Jabsen | 376/235 |
| 4,759,903 | 7/1988 | Fajeau et al. | 376/336 |

FOREIGN PATENT DOCUMENTS

| 1281596 | 10/1968 | Fed. Rep. of Germany . |
| 1911057 | 8/1970 | Fed. Rep. of Germany . |
| 2590715 | 5/1987 | France . |

OTHER PUBLICATIONS

KWU-Publication "Druckwasserreaktoren" (Pressurized Water Reactors), Order No. KWU 228, Key No. 10613Ws.11733, pp. 4 & 8.

Primary Examiner—Brooks H. Hunt
Assistant Examiner—Frederick H. Voss
Attorney, Agent, or Firm—Herbert L. Lerner; Laurence A. Greenberg

[57] ABSTRACT

A nuclear reactor includes a pressure vessel enclosing a plenum, a core in the pressure vessel, a pressure-tight encapsulation in the pressure vessel communicating with the plenum, and control members passing through the encapsulation and having first and second control member segments. The second control member segment has an absorber part to be at least partly inserted into and retracted out of the core for controlling reactivity. The first control member segment has an outer drive part. A control drive is associated with the outer drive part for adjusting the control member along the longitudinal direction thereof. An antieject device for restraining ejection of the control member out of the pressure vessel due to a leak at the encapsulation includes a rod coupling having a disengageable coupling catch interconnecting the first and second control member segments and remaining in engagement during normal control motion of the control member and means for unlocking the coupling catch. After disconnection the second control member segment and the absorber part remain in the core for assuming a position fully inserted into the core.

9 Claims, 13 Drawing Sheets

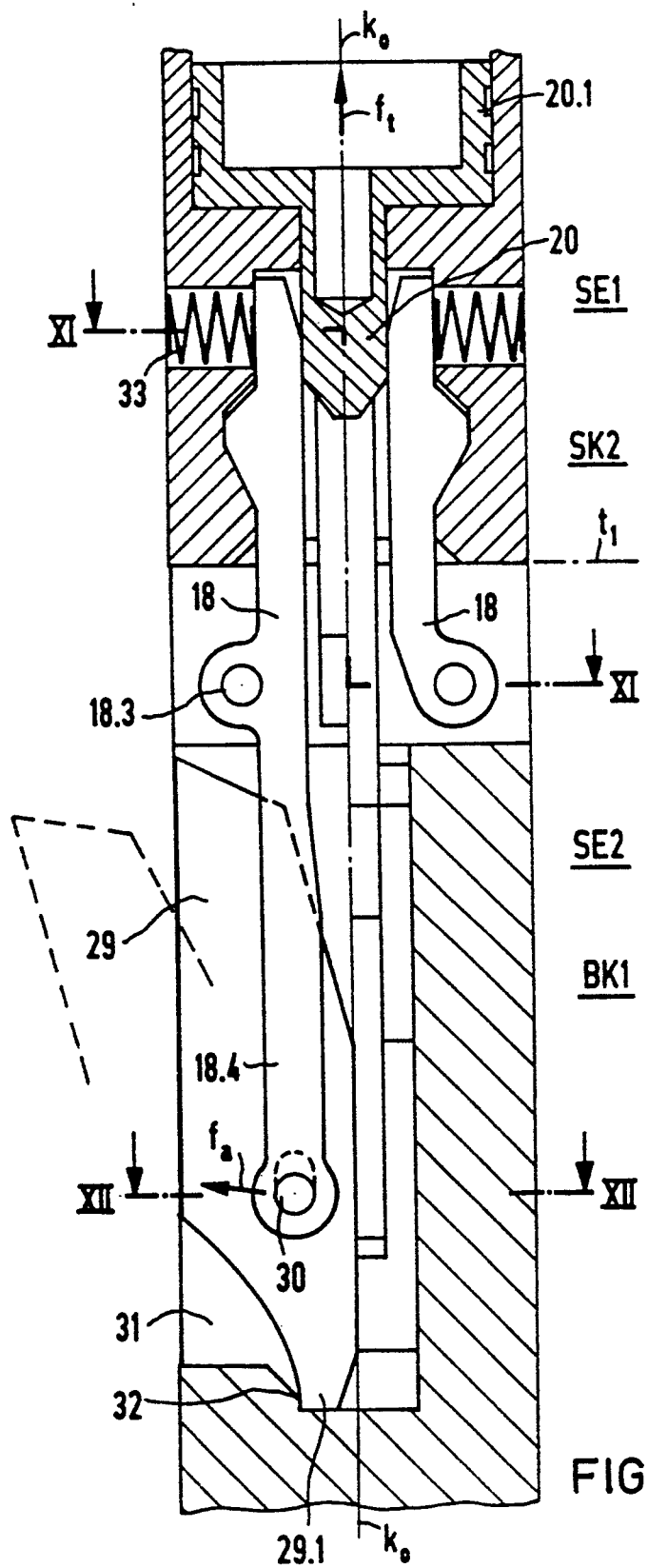
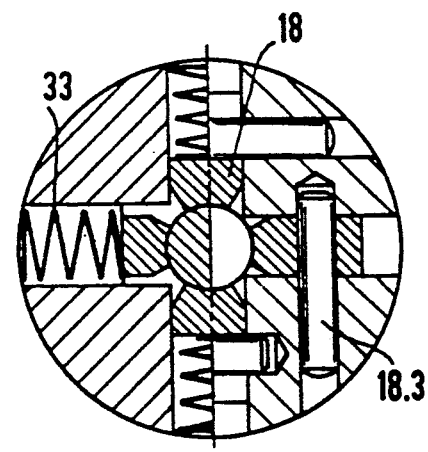
FIG 11
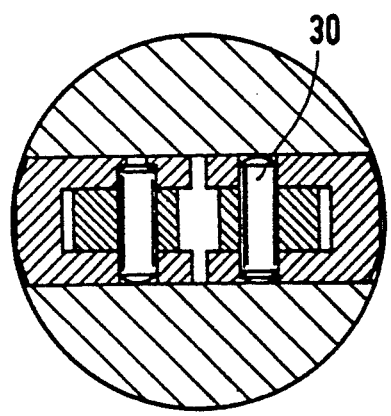
FIG 12
FIG 10

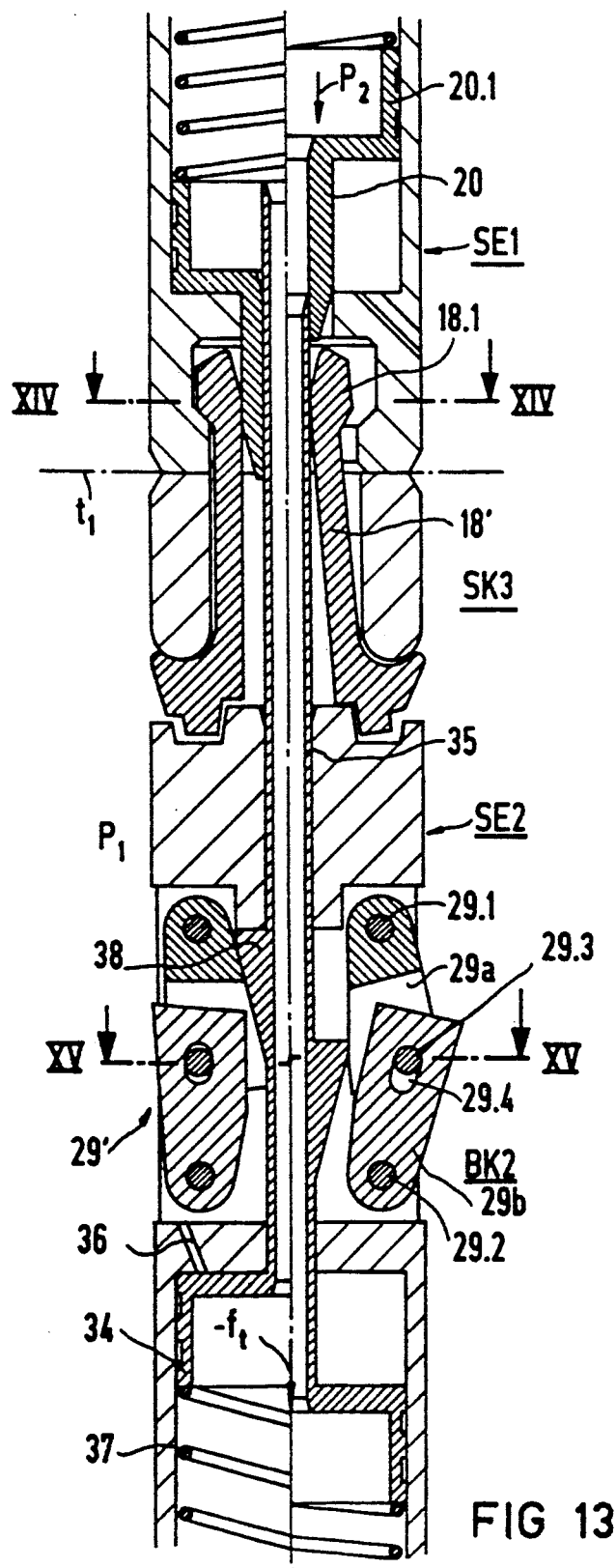
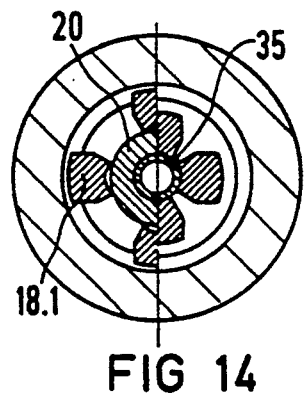
FIG 14
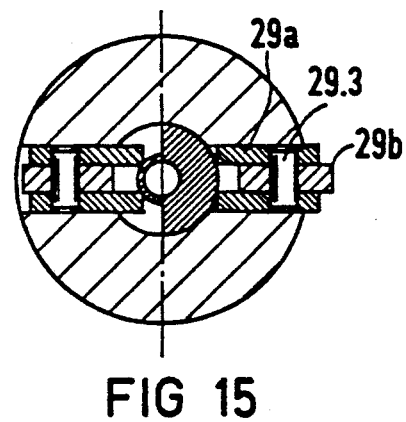
FIG 15
FIG 13

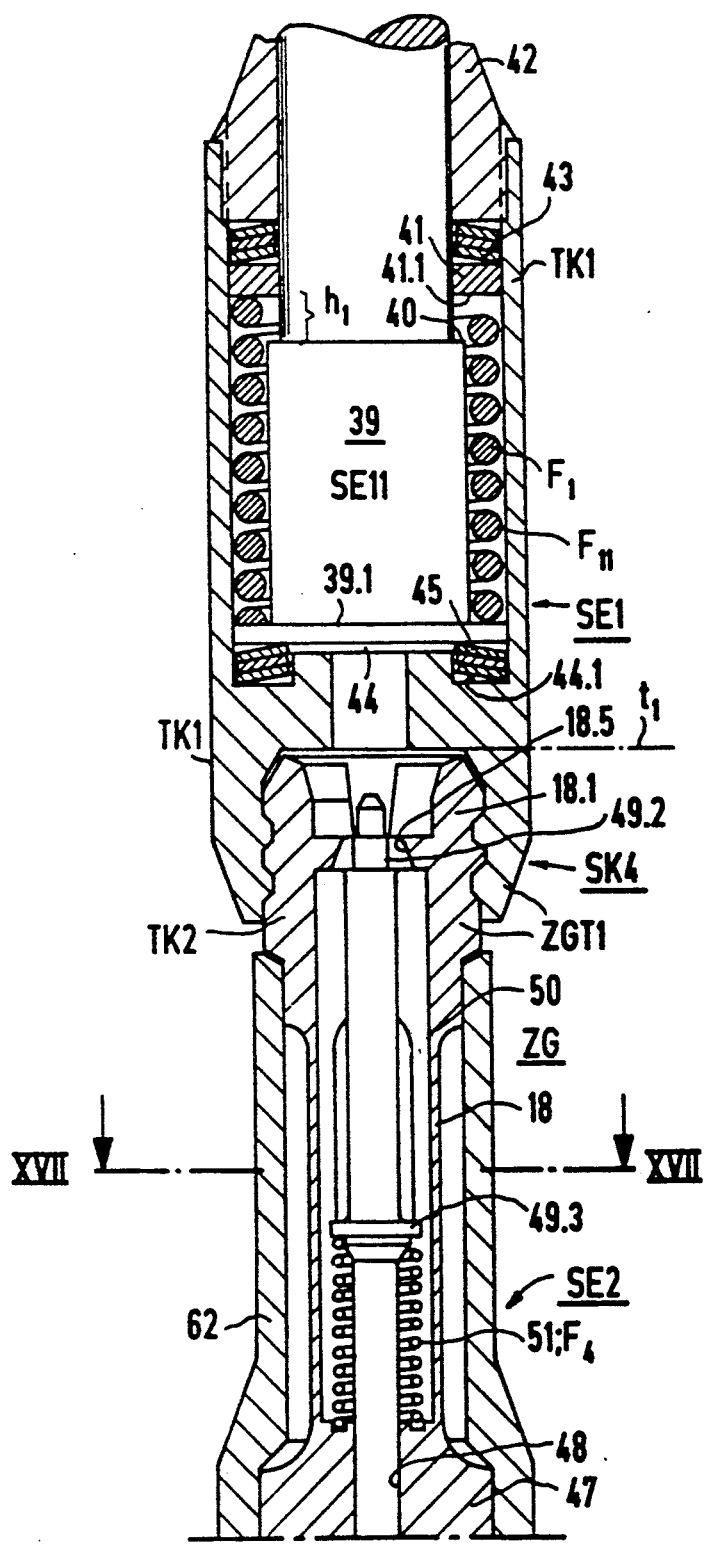
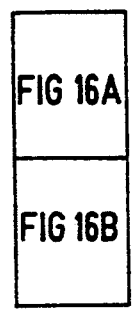
FIG 16
FIG 16A

ANTIEJECT DEVICE FOR CONTROL MEMBERS OF NUCLEAR REACTORS

CROSS-REFERENCE TO RELATED APPLICATION

This application is a Continuation of International Application PCT/EP89/00562, filed May 22, 1989.

BACKGROUND OF THE INVENTION

1. Field of the Invention

The invention relates to an antieject device for rod-like control members of nuclear reactors being passed through a pressure-tight duct or encapsulation of a wall of the nuclear reactor pressure vessel communicating with the pressure vessel plenum, the control members having first and second control member segments, a lower or inner absorber part of the second control member segment being partly or fully insertable into or retractable out of the reactor core for controlling reactivity, and an outer drive part of the first control member segment bringing the control member into interaction with a control drive for adjusting the control member along the longitudinal direction thereof, wherein differential pressure forces engaging the control member and seeking to force the control member out of the pressure vessel and thereby accelerating the control member upon the accidental occurrence of a leak at the encapsulation, are restrained from ejection at the first control member segment.

2. Description of Related Art

Such an antieject device is known from German Published, Prosecuted Application DE-AS 19 11 057. However, that document does not show the core structure of the nuclear reactor in detail. An overview of a nuclear reactor pressure vessel with its core structure and the control members and drive mechanisms therefor can be found in the publication entitled "Druckwasserreaktoren" [Pressurized Water Reactors], Catalog No. KWU 228, Code No. 10 613 Ws. 11 733, especially pages 4 and 8.

In the known antieject device described in the aforementioned German Published, Prosecuted Application DE-AS 19 11 057, a spring-biased annular piston is disposed in an annular space on an end facing toward the pressure vessel being formed by the control member drive rod and the thimble or encapsulation. That annular piston is connected to latches and, due to a pressure difference between the interior of the pressure vessel and the thimble, guide surfaces disposed in the thimble convert an axial motion of the annular piston into a radial motion of the latches until they engage teeth disposed on the outer periphery of the drive rod In the case of leakage at the thimble or encapsulation, the known antieject device offers adequate protection. However, in the hypothetical event of failure due to separation of the thimble, the annular tube can be torn away as well, in which case there is no adequate security against the second control member segment and its absorber part being driven out of the core.

It is accordingly an object of the invention to provide an antieject device for control members of nuclear reactors, which overcomes the hereinafore-mentioned disadvantages of the heretofore-known devices of this general type and to do so in such a way that it is assured that the second control member segment and its absorber part will remain in the reactor core and if it has not yet assumed the fully inserted position it will be able to drop into that position, not only if there is a leak at the encapsulation surrounding the outer part of the control member or at a corresponding thimble but also in the event of a rupture of the thimble.

SUMMARY OF THE INVENTION

With the foregoing and other objects in view there is provided, in accordance with the invention, in a nuclear reactor including a pressure vessel with a wall enclosing a pressure vessel plenum, a core in the pressure vessel, a pressure-tight encapsulation in the wall communicating with the pressure vessel plenum, rod-like control members passing through the encapsulation and having first and second control member segments, the second control member segment having an absorber part to be at least partly inserted into and retracted out of the core for controlling reactivity, and a control drive, the first control member segment having an outer drive part inside the encapsulation for bringing the control member into interaction with the control drive for adjusting the control member along the longitudinal direction thereof, an antieject device for restraining ejection of the first control member segment of the control member being accelerated by differential pressure forces engaging the control member and seeking to force the control member out of the pressure vessel due to an accidental leak at the encapsulation, comprising a rod coupling having a disengageable coupling catch interconnecting the first and second control member segments and remaining in engagement during normal control motion of the control member, the rod coupling having means for unlocking the coupling catch by responding and releasing the rod coupling if one of an upper limit value of a leakage-dependent differential pressure and a variable analogous to the differential pressure is reached, and after disconnection the second control member segment and the absorber part remaining in the core for assuming a position fully inserted into the core.

In accordance with another feature of the invention, the disengageable rod coupling is a claw coupling having a central longitudinal coupling axis and coupling arms extending axially parallel with respect to the central longitudinal coupling axis, the coupling arms being radially inwardly and outwardly deflectably supported on the second control member segment and the coupling arms having ends with coupling claws, the coupling claws having coupling protrusions with trapezoidal cross sections engaging correspondingly shaped recesses of a coupling hollow formed in the first control member segment, and the coupling catch including a locking tappet being longitudinally displaceably supported along the central longitudinal coupling axis and spring loaded in the first control member segment, the tappet reaching between the coupling claws and maintaining the coupling protrusions in the recesses in a locked position, and the tappet being retracted out of the axial vicinity of the coupling claws in an unlocked position.

In accordance with a further feature of the invention, there is provided a cylinder chamber with a bottom wall in the first control member segment, a check piston being longitudinally displaceably supported in the cylinder chamber, a restoring spring biasing the check piston in a restoring direction in the cylinder chamber, the check piston having an end facing away from the restoring spring, the locking tappet being seated on the check piston, the locking tappet extending through an opening formed in the bottom wall between the coupling claws, and the end of the check piston communicating through a wall channel formed in the first control member segment with the pressure vessel plenum, for axially displacing the check piston counter to the force of the restoring spring and pulling the locking tappet into the unlocked position if the limit value of the leakage-dependent differential pressure is reached.

The advantages attainable with the invention are above all that security against ejection of the absorber as part of the second control member segment no longer depends on the blocking device retaining the first control member segment, because the two control member segments are decoupled in the event of an accident.

In accordance with an added feature of the invention, there are provided blocking latches being inwardly and outwardly deflectably supported in a path of motion on the second control member segment in the vicinity of the rod coupling, and a control member guide plate limiting the path of motion of the blocking latches, the blocking latches moving out of the circumferential contour of the second control member segment and preventing a retracting motion of the second control member segment upon attainment of one of an upper limit value of the leakage-dependent differential pressure and a variable analogous to the differential pressure, by striking against the control member guide plate.

In accordance with an additional feature of the invention, there are provided control devices being outwardly deflectably supported on the second control member segment and having control surfaces meshing with the blocking latches, and the control devices being coupled for motion with the locking tappet for outwardly deflecting the control devices and causing an extension of the blocking latches upon axial displacement of the locking tappet.

In accordance with yet another feature of the invention, the second control member segment has transverse-axis link bolts, and the blocking latches are pivotable in and out about the transverse-axis link bolts.

In accordance with yet a further feature of the invention, the control devices are extensions of the coupling arms having free ends, the coupling arms have pivot axes, the blocking latches are pivotably connected to the free ends of the extensions, and the blocking latches are carried along into a blocking position by the extensions being radially outwardly deflected about the pivot axes of the coupling arms upon a tripping motion of the coupling arms when the coupling claws of the coupling arms meet in an extended position of the locking tappet.

In accordance with yet an added feature of the invention, there is provided a locking piston having an interior and an outer top region, the locking piston being deflectable coaxially with and counter to the check piston for controlling the blocking latches in the second control member segment and being spring-loaded in a restoring direction, the locking piston having a hollow piston rod penetrating the locking tappet of the check piston and carrying a low internal pressure $p_2$ in the case of a leakage accident to the interior of the locking piston, the locking piston having an outer pressure $p_1$ bearing on the outer top region of the locking piston and being equivalent to the pressure of the pressure vessel plenum, where $p_2 << p_1$, and the differential pressure $\Delta p = p_2 - p_1$, and the piston rod of the locking piston having control cams moving the blocking latches in engagement with the control cams outwardly into a blocking position upon attainment of the limit value of the differential pressure and axial displacement of the locking piston.

A further safety barrier is created in this way.

Not only does decoupling of the first control member segment from the second control member segment take place, but the second control member segment is also provided with blocking latches that can be deflected outward and inward, and the next control member guide plate located above the blocking latches is located in the path of motion of these latches and thus acts as a stop for the blocking latches. Even the slightest motion impulse that tends to accelerate the second control member segment upward is thus also rendered insignificant, because the second control member segment is blocked against upward motion practically simultaneously with the decoupling operation. In the event that the second control member segment with its absorber has not yet attained the fully inserted position, it can then drop downward.

With the objects of the invention in view, there is also provided, in a nuclear reactor including a pressure vessel with a lid and an interior, envelopes pressure-tightly connected to the pressure vessel and communicating with the interior thereof, a core with a core structure being disposed in the pressure vessel, fuel assemblies disposed in the core structure and defining vertical longitudinal channels between the fuel assemblies, and rod-like control members each passing pressure-tightly through the lid and having a part protruding to the outside being surrounded by a respective one of the envelopes, each of the control members having a first control member segment, a drive part, a second control member segment, a spinner part of the second control member segment, and a lower absorber part of the second control member segment adjoining the spinner part, and the absorber part being at least partly insertable into and at least partly retractable out of the longitudinal channels for varying reactivity of the core; an antieject device responding as a function of a pressure difference for blocking the control members against undesirable ejection whenever pressure forces exceeding a limit value and resulting from a difference between an internal pressure vessel pressure and an outer pressure engage an affected control member as a result of leakage at an envelope, comprising an intermediate member spring-elastically coupling the drive part to the spinner part; a first spring-elastic coupling with a given spring rigidity being disposed between the drive part and the intermediate member for transmitting tensile and compressive forces of the drive part to the intermediate member for executing normal raising and lowering motions of a control member within a first relative stroke; means for rigidly coupling the drive part and the intermediate member whenever a spring travel of the first spring-elastic coupling exceeds the first relative stroke as a result of increasing tensile forces of the drive part; the intermediate member having a first intermediate member part constructed as an elongated transmission member and a second intermediate member part being force-lockingly connected with the spinner part as a power take-off element, the first intermediate member part being spring-elastically coupled with the drive part and being rigidly coupled with the drive part as a function of tensile force, a second spring-elastic coupling with a spring rigidity being greater than the given spring rigidity coupling the first intermediate member part to the second intermediate member part; a latch carrier being longitudinally displaceably supported and spring-loaded on the intermediate member and having blocking latches, the blocking latches being radially spread apart in a path of motion for outwardly deflecting the second spring-elastic coupling upon a second relative stroke being effected as a function of tensile force of the first intermediate member part relative to the second intermediate member part and remaining spread apart as long as an increased tensile force prevails between the drive part and the intermediate member; guide plates disposed in the control members having stops in the path of motion of the spread-apart blocking latches; a disengageable rod coupling in the form of an expanding coupling for splitting the first intermediate member part into a first released separating body remaining on the drive part and a second separating body to be blocked from further motion by the blocking latches, a locking tappet being supported on the second separating body, the locking tappet normally maintaining an expanded coupling between the first and second separating bodies and being carried along into an unlocking position upon a third relative stroke between the second separating body and both the latch carrier and the second intermediate member part, the expanding coupling having coupling elements releasing the first separating body in the unlocking position, and the third relative stroke being tripped whenever the spread-apart blocking latches are restrained from further axial motion by the stops of the guide plates.

This embodiment provides a particularly advantageous antieject device for control members of nuclear reactors, which is suitable for retrofitting.

In this embodiment, use is made of a multiple spring-elastic coupling, which on one hand suppresses the straining forces that act upon the control member drive during normal actuation, and also advantageously provides precise control for the functional course of the extensible blocking latches and the separation of the claw coupling between the first and second control member segments.

Other features which are considered as characteristic for the invention are set forth in the appended claims.

Although the invention is illustrated and described herein as embodied in an antieject device for control members of nuclear reactors, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

BRIEF DESCRIPTION OF THE DRAWINGS

FIG. 10 is another fragmentary, longitudinal-sectional view of a second exemplary embodiment of a disengageable rod coupling, which is structurally and functionally combined with a blocking latch configuration;

FIG. 11 is a cross-sectional view taken along the line XI—XI of FIG. 10, in the direction of the arrows;

FIG. 12 is a cross-sectional view taken along the line XII—XII of FIG. 10, in the direction of the arrows;

FIG. 13 is a fragmentary, longitudinal-sectional view of a third exemplary embodiment of a disengageable rod coupling, which is structurally combined with a blocking latch configuration that, latter unlike the device shown in FIGS. 10-12, is actuated hydraulically instead of mechanically, by a locking piston that is movable in contrary motion relative to the check piston;

FIG. 14 is a cross-sectional view taken along the line XIV—XIV of FIG. 13, in the direction of the arrows;

FIG. 15 is a cross-sectional view taken along the line XV—XV of FIG. 13, in the direction of the arrows;

FIG. 16 is a legend for FIGS. 16A and 16B which are fragmentary, longitudinal-sectional views of a fourth exemplary embodiment of a disengageable rod coupling, that is once again structurally combined with a blocking latch configuration, in which

FIGS. 21-24 are schematic views of various points in time during the tripping of the antieject device of FIG. 6, wherein FIG. 21 shows a position of repose, FIG. 22 shows the execution of an operating increment, FIG. 23 shows an outward deflection of the blocking latches in the event of an accident, and FIG. 24 shows the unlocking of the disengageable rod coupling.

DESCRIPTION OF THE PREFERRED EMBODIMENT

Figure 1:
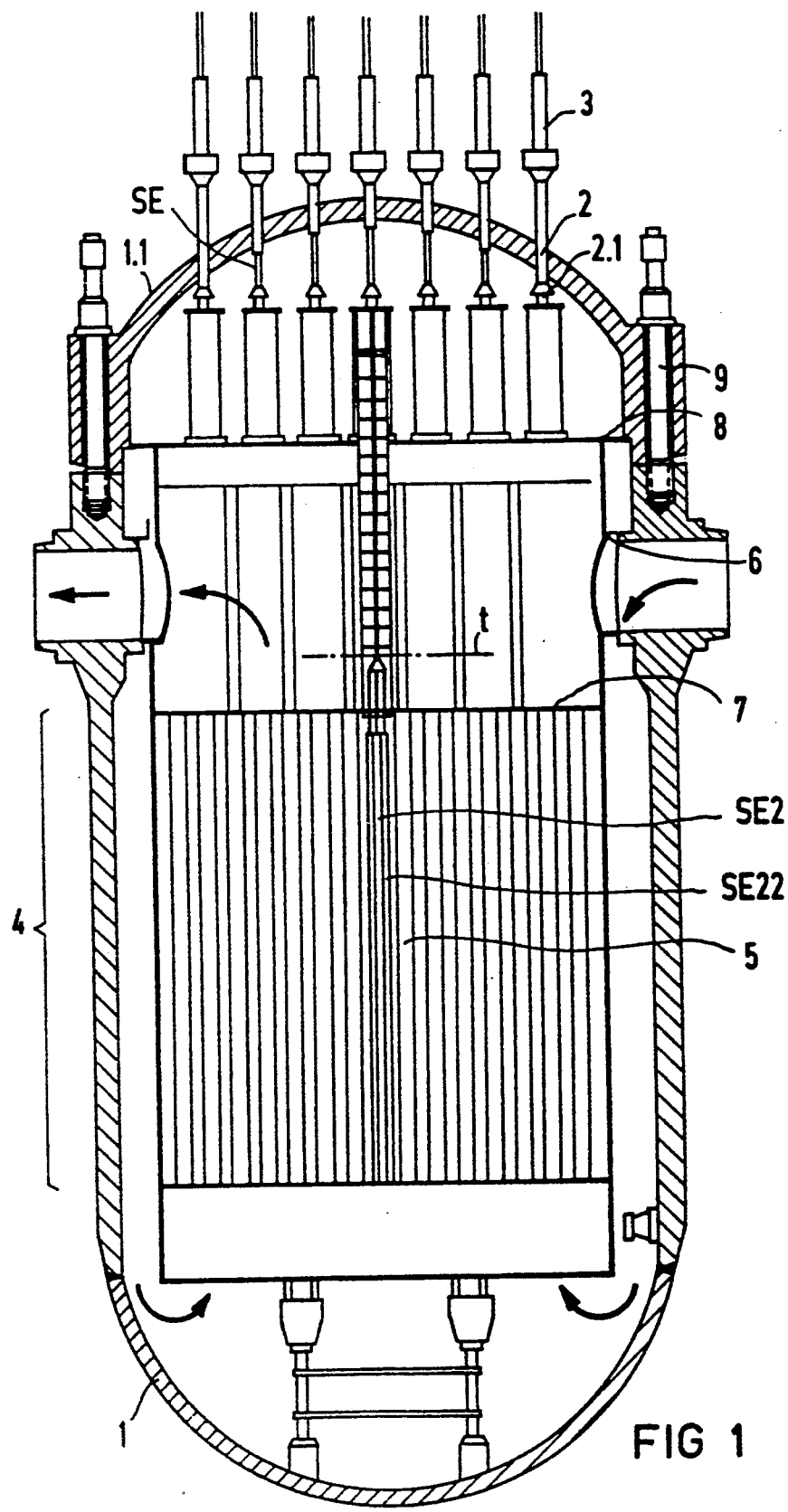
FIG. 1 is a diagrammatic, longitudinal-sectional view of a pressure vessel of a pressurized water reactor, which illustrates the basic disposition of the control members and their drive mechanisms wherein the drawing figure is equivalent to what is shown on page 4 of the aforementioned publication, "Druckwasserreaktoren"
Figure 2:
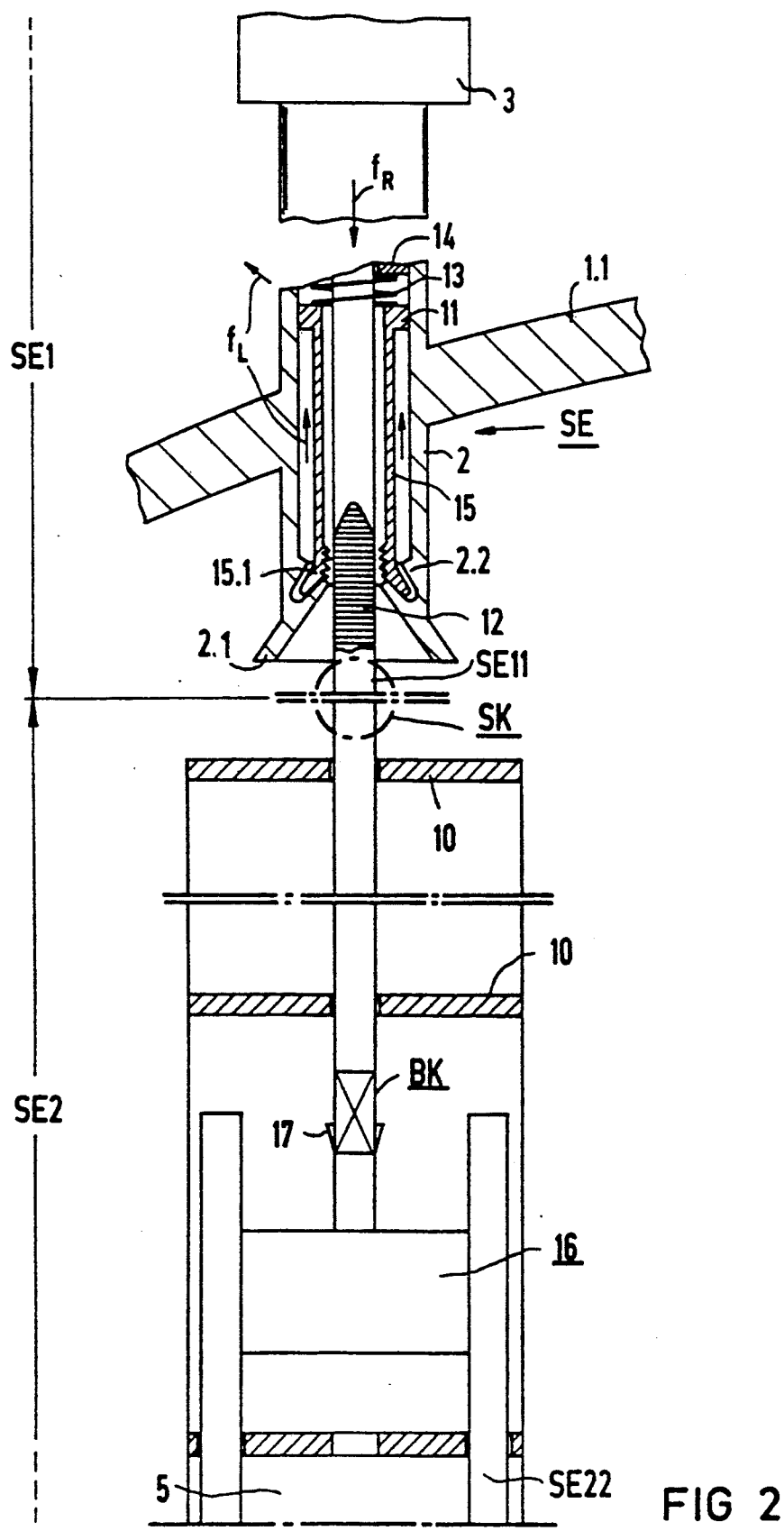
FIG. 2 is fragmentary, highly simplified, basically illustrated, partly sectional view of an antieject device according to the invention for a single control member, which operates with triple redundancy; wherein an upper lock that is accommodated in an envelope or thimble, is shown as one option for retention of a first control member segment (which is equivalent to that shown in the aforementioned German Published, Prosecuted Application DE-AS 19 11 057), and wherein a disengageable rod coupling, for instance of the kind shown in FIG. 3, can conceivably be disposed in the vicinity of a portion III, and a lower control member segment is additionally secured by blocking latches, having a stop therefor which is constructed as a control member guide plate contacting them.

Referring now to the figures of the drawings in detail and first, particularly, to FIGS. 1 and 2 thereof, there is seen an antieject device in FIG. 2 which is usable for rod-like control members, of the kind shown for a reactor pressure vessel 1 for pressurized water reactors in FIG. 1. The various control members are generally identified by symbol SE and are each passed through a pressure tight duct in the form of an encapsulation, envelope or thimble, or generally a hollow-cylindrical pressure-proof encapsulation. Each envelope or encapsulation 2 includes an actuating or control drive 3 (not shown in further detail), which is also called a control rod drive. One of the control members SE is shown in somewhat greater detail in section in FIG. 1. A rod coupling is disposed where a horizontal imaginary line t shown in phantom lines extends. Above the rod coupling is a first control rod or control member segment or section SE1, with a drive part thereof which interacts a control drive 3, and a second control member segment or section SE2, which is held over the great majority of the axial length thereof by an absorber part SE22 (shown in black lines in FIG. 1) that is located under the line t. The absorber part SE22 can be inserted partially or all the way into a reactor core 4 by actuation of the control drive 3, or it can be extended out of the reactor core 4 into axial channels remaining between various fuel assemblies 5. Element 6 is a guide structure resting on an upper grid plate 7 of the core support structure. The interior of the guide structure receives guide inserts 9, that protrude through a cover plate 8, for the various control members SE. The guide inserts 9, which are inserted into hollow-cylindrical bodies, have control member guide plates 10 that are stacked one above the other in a plurality of stories and are spaced apart from one another, as seen in FIG. 2. The envelopes or thimbles 2, which are passed in a pressure-tight manner through a lid 1.1 of the pressure vessel 1, are provided with conical "caps" 2.1 on the inner ends thereof, as seen in FIG. 2.

Retaining devices for a rod-like drive part SE11 of a control member SE can be attached to the lower ends of the envelopes or encapsulations 2, for firmly holding the entire first control member segment SE1 and its drive part SE11 to prevent its ejection if differential pressure forces should engage the first control member SE1 at the encapsulation or envelope or encapsulation 2 outside the lid 1.1 and attempt to force the control member out of the pressure vessel 1, in the accidental event of a leak, indicated by a flow arrow $f_L$. A locking device as described in the aforementioned German Published, Prosecuted Application DE-AS 19 11 057 which is shown in FIG. 2, has an annular piston 11 which reaches around the drive part SE11 that is provided with an annular fluting 12 and is spring-loaded in the restoring direction indicated by an arrow $f_R$, through the use of a helical compression spring 13. Element 14 is an annular stop for the restoring spring 13. Elongated, finger-like ratchets 15, which terminate in toothed claws 15.1, project from the annular piston 11. The claws are normally kept out of engagement with the annular fluting 12 by the conical jacket of the cap 2.1. However, in the case of a leak on the outside of the envelope or encapsulation, if a pressure difference $p_1-p_2$ (where $p_1$ is the pressure in the pressure vessel plenum and $p_2$ is the ambient pressure) exceeds an allowable limit value, the annular piston 11 is abruptly axially displaced counter to the direction of the arrow $f_R$, and the toothed claws 15.1 are compelled to engage the annular fluting 12 by oblique surfaces on cranks 2.2 on the inner wall of the envelope or encapsulation 2.

FIG. 2 also shows a spinner or spider part 16, which has a plurality of the absorber members SE22 joined mechanically stably to one another to form a "spinner", which is then driven into the longitudinal channels of the fuel assembly 5 located beneath it. In principle, however, the invention is also usable for control members that have only a single absorber part.

Between the first and second control member segments SE1 and SE2 is a disengageable rod coupling or clutch generally identified by reference symbol SK, by means of which the two segments can be separated from one another. Various embodiments of the rod coupling SK will be described in detail below. Inside the second control member segment SE2 above the spinner part 16, is a blocking latch configuration BK, having latches 17 which are shown in an extended state, so that in the event of a possible upward motion of the control member segment SE2, the extended latches 17 will come to a stop in the next control member guide plate 10 in succession. The control member segment or configuration SE2, which is braked in this way, can then subsequently drop all the way into the core and thus assume the safest position.

Figure 3:
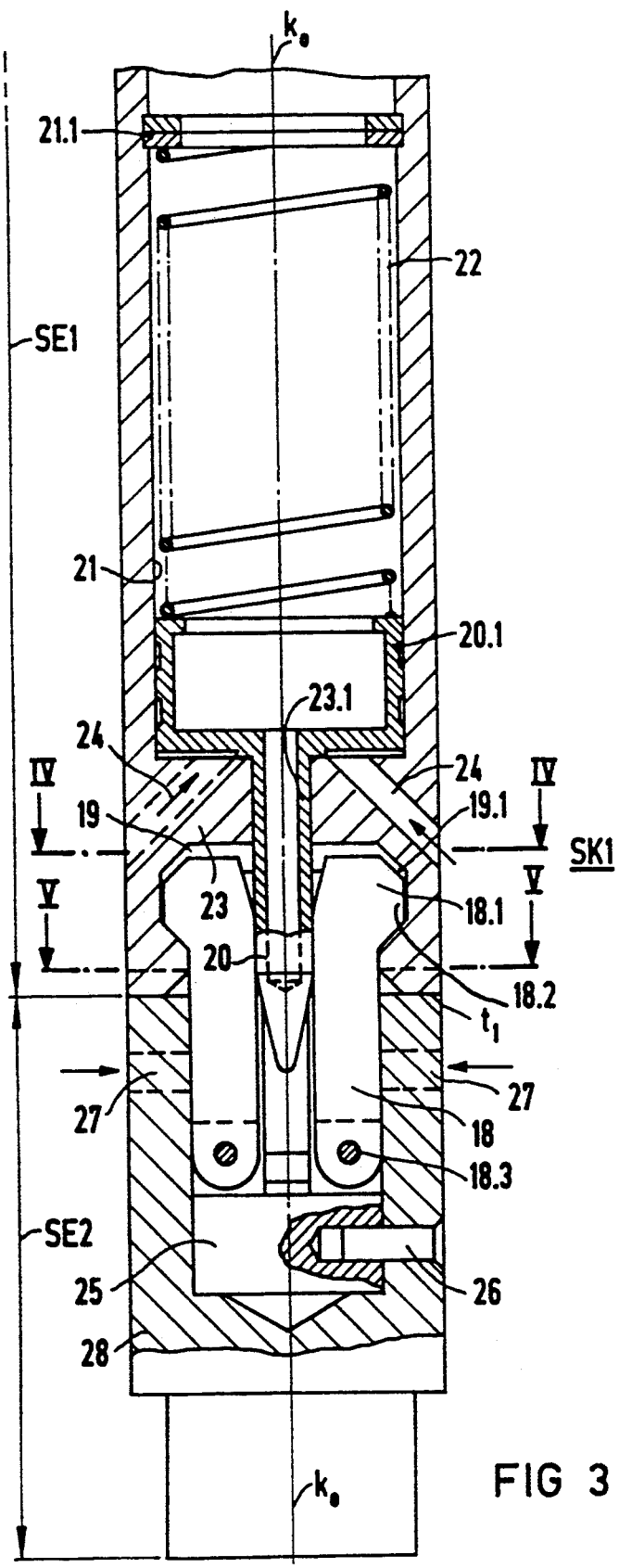
FIG. 3 is a fragmentary, partly broken-away, longitudinal-sectional view showing a first exemplary embodiment of the potion III of FIG. 2, wherein a disengageable rod coupling with coupling arms having coupling claws disposed on their ends, and a locking tappet engaging the coupling claws and being disposed on a spring-loaded check piston are shown.
Figure 4:
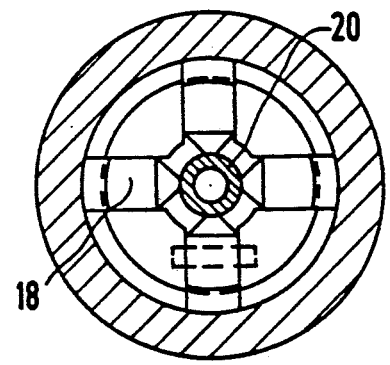
FIG. 4 is a cross-sectional view taken along the plane IV—IV of FIG. 3, in the direction of the arrows.
Figure 5:
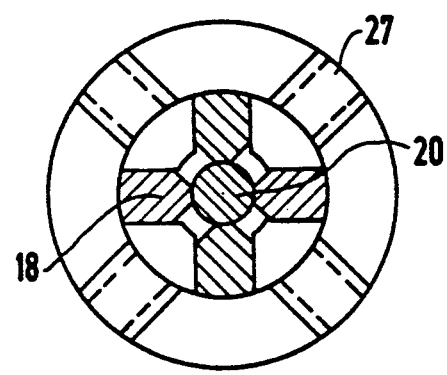
FIG. 5 is a cross-sectional view taken along the plane V—V of FIG. 3, in the direction of the arrows.
Figure 6:
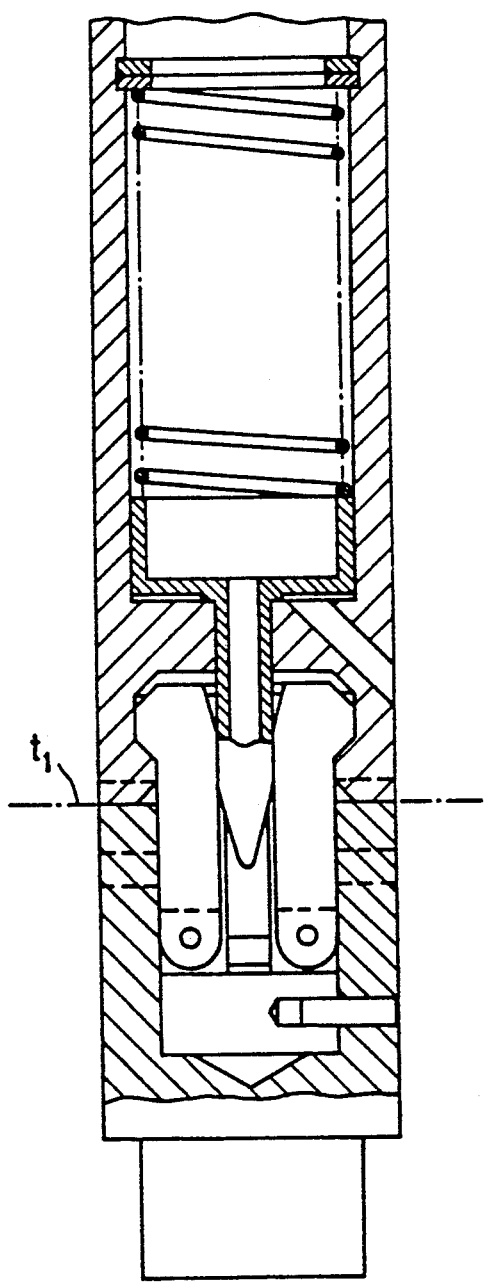
FIGS. 6-9 are also longitudinal-sectional views, showing various phases of motion beginning with a coupled state in FIG. 6 which is equivalent to that of FIG. 3, and progressing through an unlocking motion of the check piston with its locking tappet in FIG. 7, unlocked coupling claws in FIG. 8, and the coupling halves being separated from one another in FIG. 9 with the upper half belonging to the first control member segment and the lower half belonging to the second control member segment.

A first exemplary embodiment of a disengageable rod coupling SK1 is shown in FIG. 3, in combination with FIGS. 4 and 5. As was already basically explained in conjunction with FIG. 2, the first control member segment SE1 is joined to the second control member segment SE2 through a disengageable rod coupling SK1, which remains in engagement during the normal control motion of the control member SE. The rod coupling SK1 is provided with means 18-24 for unlocking the coupling catch. These means respond when the upper limit value of a leak-dependent differential pressure $\Delta p$, or a variable analogous to the differential pressure $\Delta p$ is reached, and release the rod coupling SK1. The separated second control member segment SE2 and its absorber part SE22 remain in the core seen in FIG. 1 and are able to assume their position in which they are fully inserted into the core. Specifically, the disengageable rod coupling SK1 is a claw coupling, having coupling arms 18 that are supported on the second control member segment SE2 in such a way that they can be deflected radially in and out. The arms 18 have coupling claws 18.1 on the ends thereof and extend axially parallel with respect to a central longitudinal axis $k_o$-$k_o$ of the coupling. The coupling claws 18.1 have coupling protrusions 18.2 that in particular have trapezoidal cross sections and engage correspondingly shaped recesses 19.1 or a coupling hollow 19 of the first control member segment SE1. A dividing plane between the two segments SE1 and SE2 is indicated by reference symbol $t_1$. The coupling arms 18 intersect this plane approximately halfway along the length thereof. The coupling arms 18 are supported on hinge pins 18.3, having a transverse axis. The hinge pins 18.3 are part of a cylindrical coupling insert element 25, which is inserted into a corresponding bore in the head of the second control member segment SE2 and pinned there by a pin 26.

The coupling catch includes a locking tappet 20, that is supported longitudinally displaceably and under spring loading along the longitudinal axis $k_o$-$k_o$ of the coupling. In the locked position shown in FIGS. 3-6, this tappet fits between the coupling claws 18.1 and retains them and their coupling protrusions 18.2 in the recesses 19.1, while in contrast in the unlocked position seen in FIGS. 7-9, it is retracted from the axial region of the coupling claws 18.2.

Figure 7:
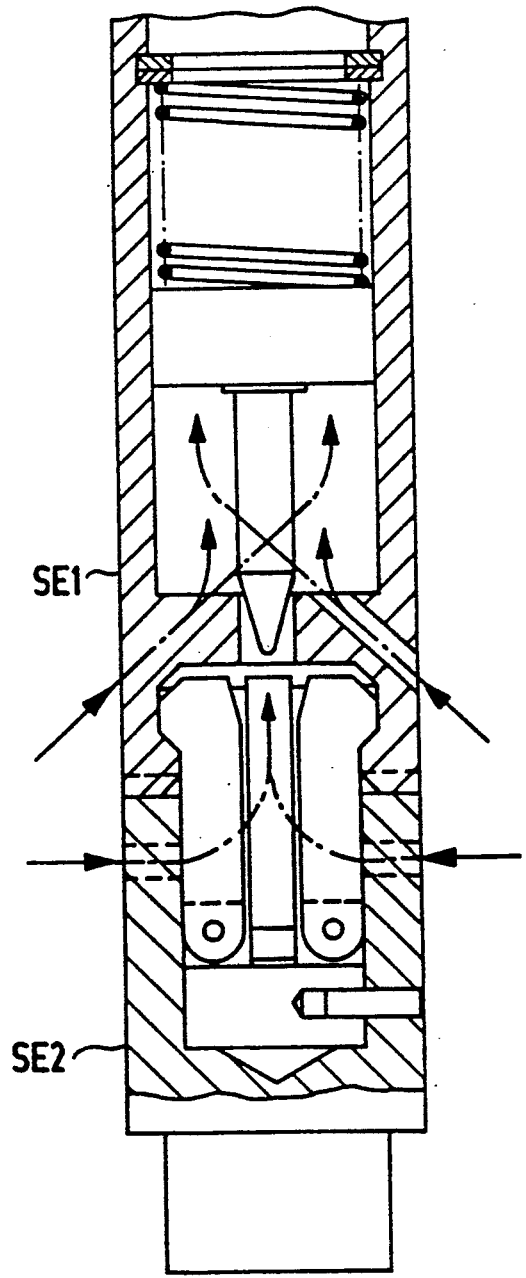
Figure 8:
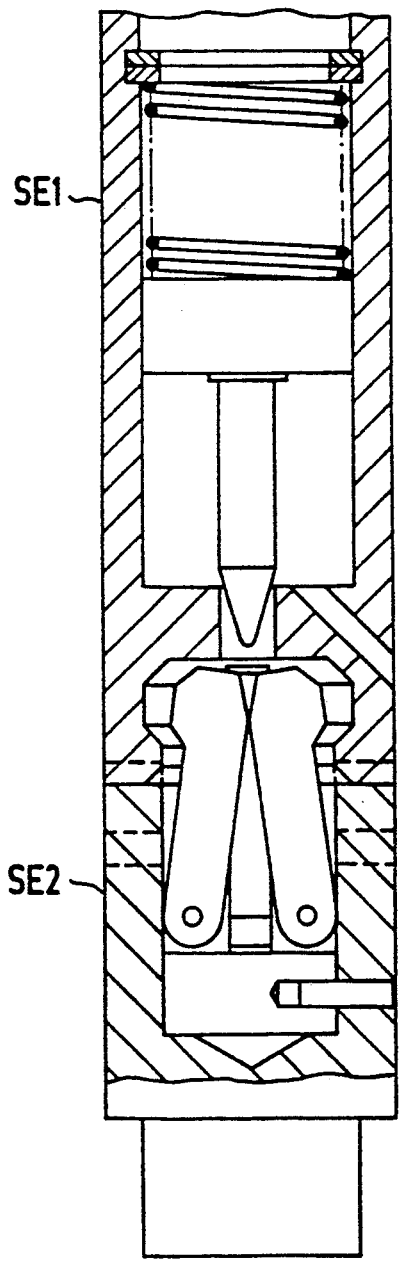
Figure 9:
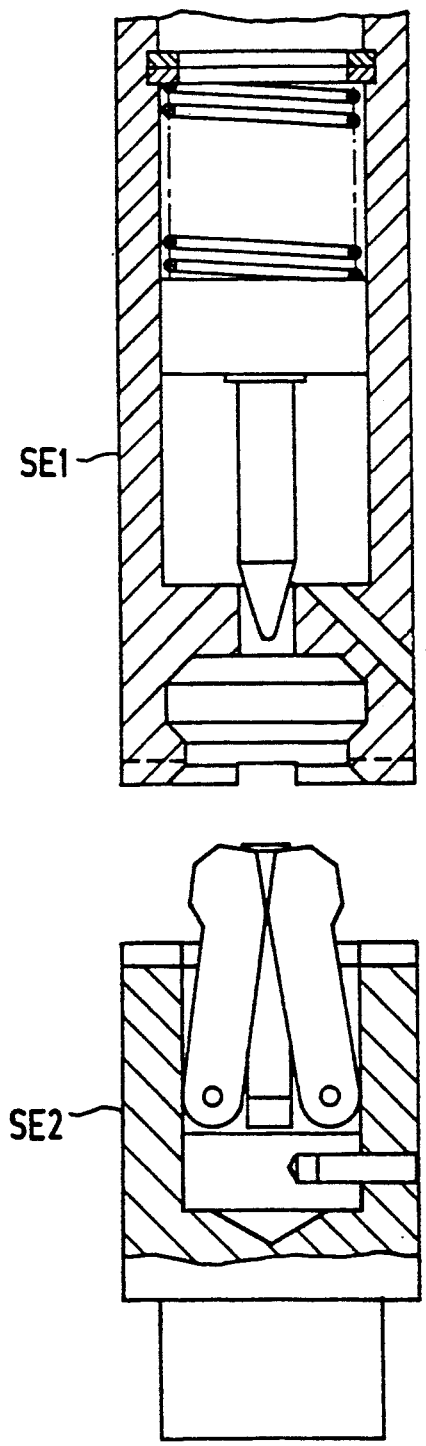

The locking tappet 20 is seated on a check piston 20.1, which is longitudinally displaceably supported and spring loaded in the restoring direction in a cylinder chamber 21 in the interior of the first control member segment SE1. A helical compression spring 22 is a restoring spring that is supported at one end on the check piston 20.1 and at the other on an inner collar 21.1 of the hollow 21. The locking tappet 20 reaches through an opening 23.1 formed in a bottom wall 23, between the coupling claws 18.1. The end of the locking tappet 20 is sharpened to a conical point, in order to make the locking and unlocking motion easier. The end of the check piston 20.1 remote or facing away from the restoring spring 22 communicates through a wall channel 24 formed in the bottom wall 23 with a pressure vessel plenum, so that when the limit value of the leak-dependent differential pressure $\Delta p$ is reached, the check piston 21 is axially displaced, counter to the force of its restoring spring 22, and the locking tappet 20 is thus pulled into the unlocked position shown in FIG. 7. The unlocking motion is further reinforced by a flow indicated by flow arrows in FIG. 7. To this end, separate flow openings 27 are also provided in the wall of a head 28 of the second control member segment SE2. The views of FIGS. 7-9 show the unlocking and separating operation for the two control member segments SE1 and SE2 and are self-explanatory.

The exemplary embodiment of FIGS. 10-12 shows that extensible and retractable blocking latches 29 are supported on the second control member segment SE2 in the vicinity of the rod coupling SK2, and that when an upper limit value of the leakage-dependent differential pressure $\Delta p$ or a variable analogous to this differential pressure is reached, these latches move out of the circumferential contour of the second control member segment SE2 and prevent an outward motion of the second control member segment SE2, by striking a control member guide plate that limits their path of motion. Reference is made on this point to the discussion pertaining to FIG. 2. The blocking latches 29 are supported in such a way that they can be pivoted in and out about hinge pins with transverse axes or transverse-axis link bolts 30, and they are located in a fitted recess 31 in a position of repose shown in FIG. 10. A latch pawl 29.1, with a vertical-oblique edge, forms a tilting edge about which the blocking latches 29 can pivot outward, whenever extensions 18.4 of the coupling arms 18 execute a swiveling motion about a link axis of the hinge pins 18.3 as represented by an arrow $f_a$ and as a result, whenever the locking tappet 20 executes a motion in the direction of an arrow $f_t$ as a function of the differential pressure, opens up the space between the ends of the coupling arms 18, so that these arms are moved toward the center or in the direction of the coupling axis $k_o$-$k_o$ by radially acting helical compression springs 33. The dividing plane between the two segments SE1 and SE2 is again indicated by reference symbol $t_1$, and the blocking latch configuration is identified overall by reference symbol BK1.

It is a general feature of this exemplary embodiment that the blocking latches 29 engage control devices (extensions 18.4), or control surfaces of these control devices, and that these control devices are coupled for motion with the locking tappet 20, so that upon axial displacement of the locking tappet 20, the control devices 18.4, 18 are also deflected, thus causing the projection of the blocking latches 29. The extended position of the blocking latches 29 is shown in broken lines.

In the exemplary embodiment of FIGS. 13-15, the third embodiment of the disengageable rod coupling is indicated by reference symbol SK3, and the second embodiment of the blocking latch configuration is indicated by reference symbol BK2. The blocking latches 29' in this case are each constructed as toggle lever link straps 29a, 29b, each having a respective transverse-axis hinge pin 29.1, 29.2. The two straps of a pair are pivotably connected to one another through a hinge pin 29.3 and an oblong slot 29.4. The blocking latches 29' are controllable by a locking piston 34 that is deflectable outward and coaxially relative to the check piston 20.1 but counter to it. A hollow piston rod 35 of the locking piston 34 penetrates the locking tappet 20 of the check piston 20.1 and carries an internal pressure $p_2$, which is low in the case of a leakage accident, to the interior of the locking piston 34 that has an outer pressure $p_1$ which bears on the top or outside of the locking piston 34. Reference is made in this regard to a pressure transmission bore 36, for example. The outer pressure $p_1$ is equivalent to the pressure of the pressure vessel plenum, the internal pressure $p_2 << $ in comparison to $p_1$, and $\Delta p = p_2 - p_1$. The piston rod 35 of the restoring locking piston, which is spring-loaded by a restoring spring 37, is provided with control cams 38, which move the blocking latches 29' that are in engagement with the control cams 38 into a blocking position shown on the right-hand side of FIG. 13, when the limit value of the differential pressure $\Delta p$ is reached and upon axial displacement of the locking piston 34 as indicated by a directional arrow $-f_t$. In comparison with the versions of FIGS. 3 and 10, coupling arms 18' of FIG. 13 are modified somewhat, but they function in the same way. The dividing plane between the two control member assemblies SE1 and SE2 is again indicated by reference symbol $t_1$. The left-hand part of FIG. 13 shows the normal position, and the right-hand part shows the tripping position, as mentioned.

Figure 16B:
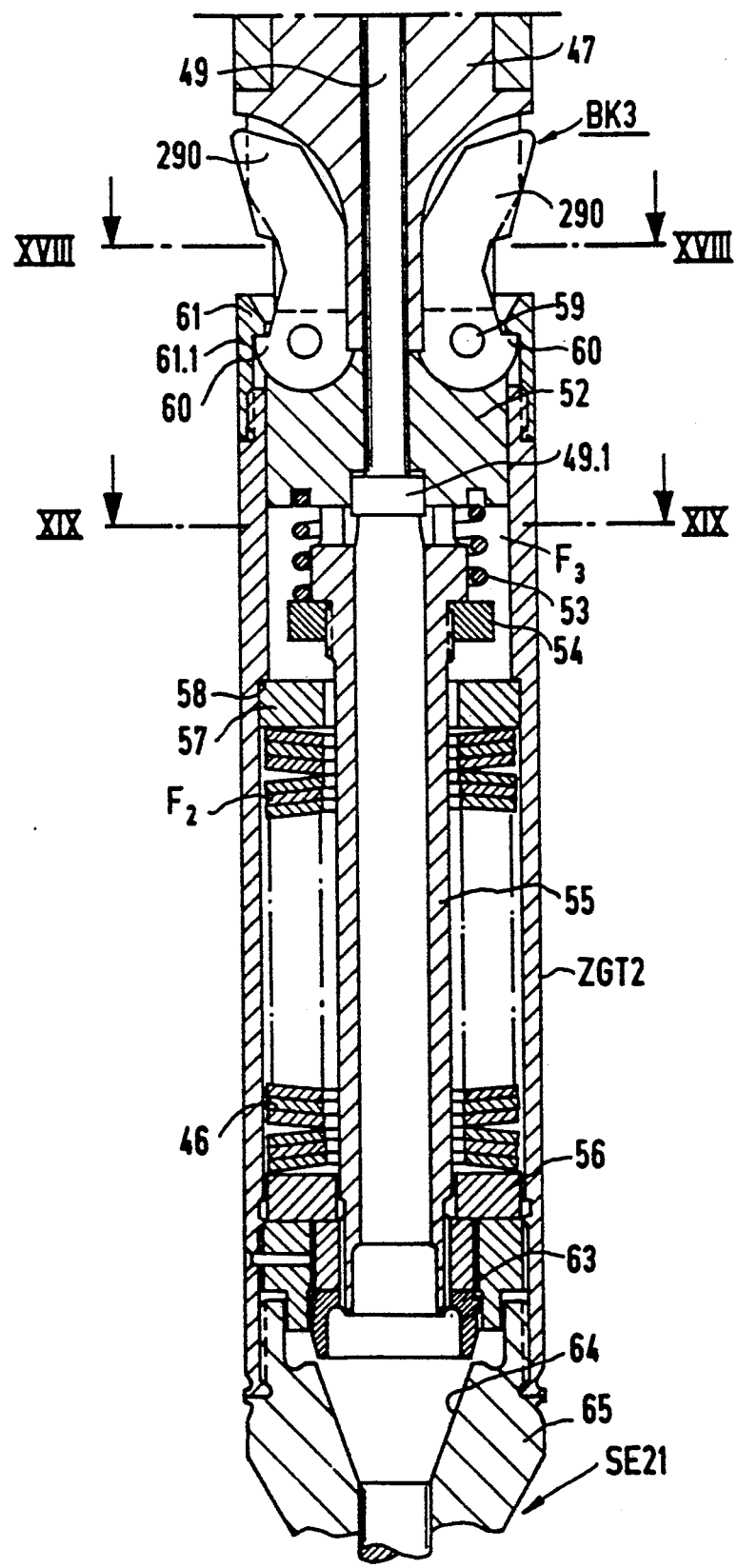
FIG. 16B is an extension of FIG. 16A.
Figure 17:
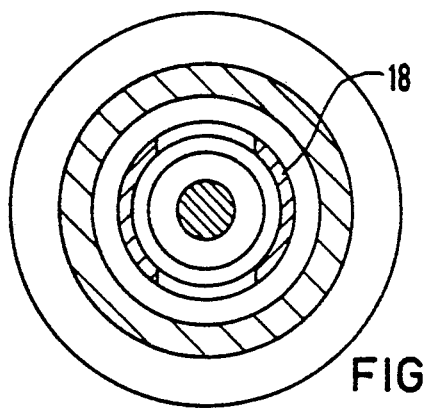
FIG. 17 is a cross-sectional view taken along the line XVII—XVII of FIG. 16A, in the direction of the arrows.
Figure 18:
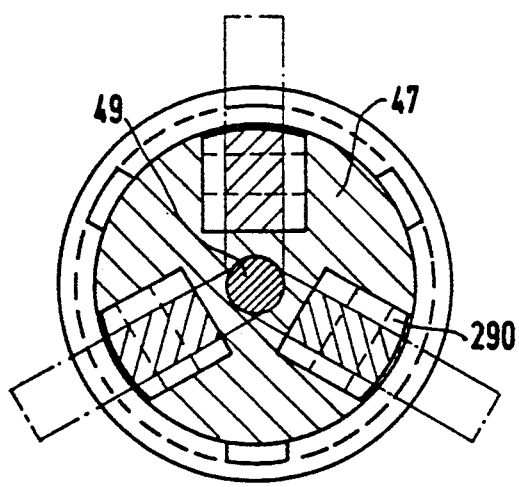
FIG. 18 is a cross-sectional view through a blocking latch configuration, which is taken along the line XVIII—XVIII of FIG. 16B, in the direction of the arrows.
Figure 19:
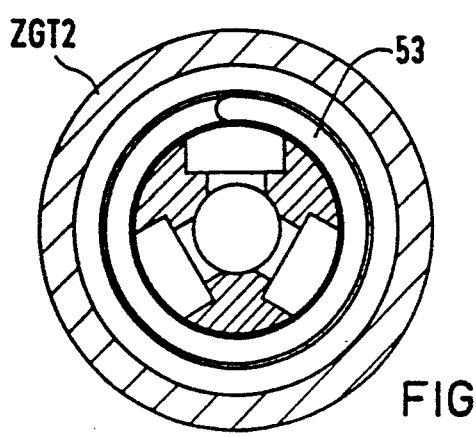
FIG. 19 a cross-sectional view through a second divider body of the first intermediate member part below a blocking latch carrier, which is taken along the plane XIX—XIX of FIG. 16B, in the direction of the arrows.
Figure 20:
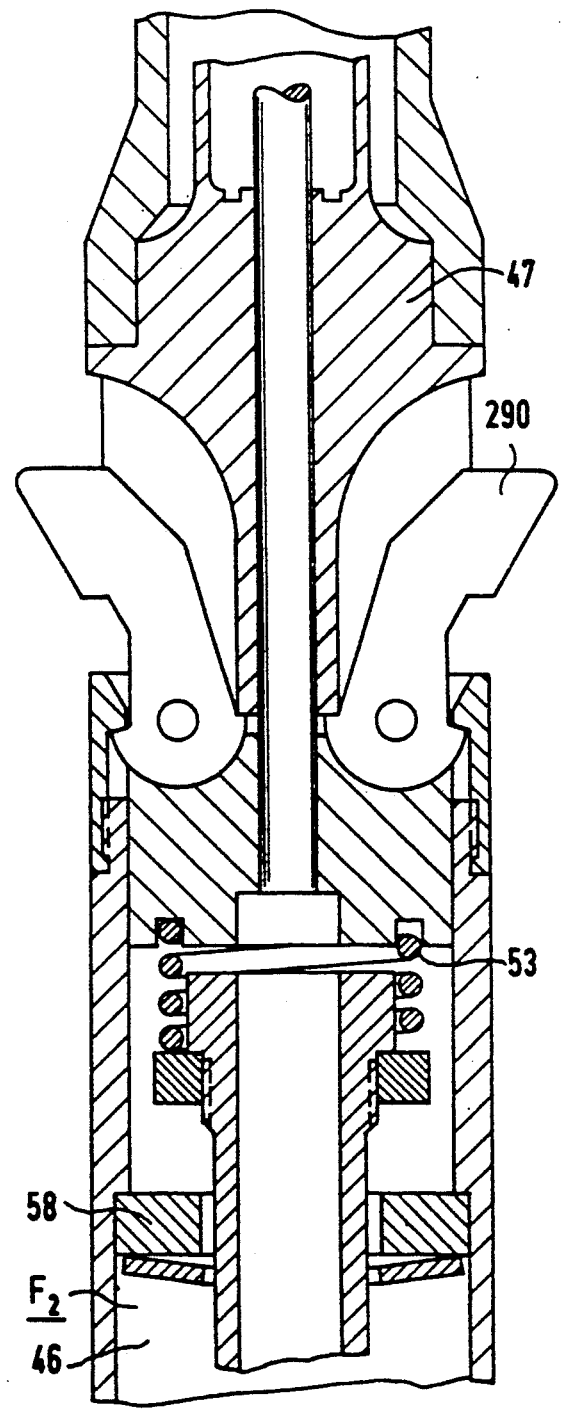
FIG. 20 is a further fragmentary, longitudinal-sectional view of a portion of the blocking latch part shown in FIGS. 6, but with the latches extended.
Figure 21:
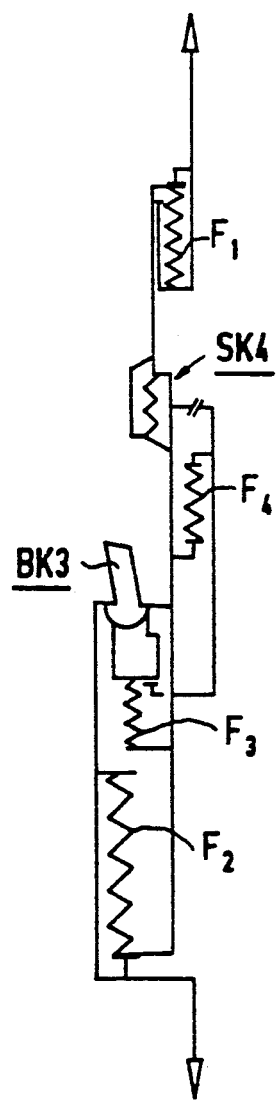
Figure 22:
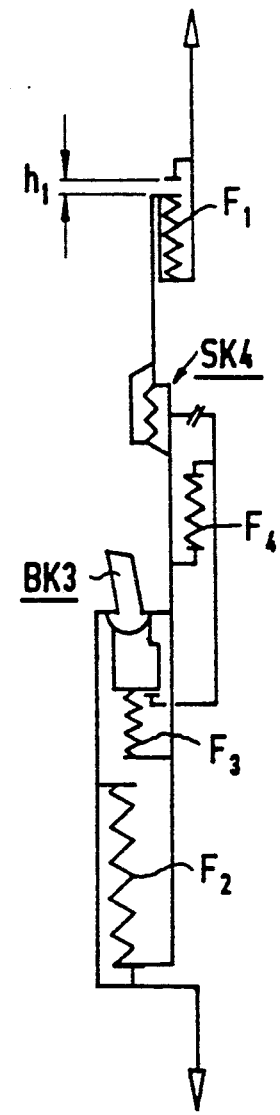

Referring to the exemplary embodiment of FIGS. 16-25, but first to FIG. 16, there is seen a disengageable rod coupling SK4, an associated dividing line again bearing reference symbol $t_1$ and a blocking latch configuration BK3. The drive part SE11 of the first control member segment SE1 has a reinforced rod head 39 with a lower flange or collar 39.1. The drive part SE11 is coupled to a spinner or spider part SE21 beginning at the lower end of FIG. 16B, in a spring-elastic manner through an intermediate member ZG. The rod-like intermediate member ZG includes a first intermediate member part ZGT1 and a second intermediate member part ZGT2. The first part ZGT1 can be opened up by the disengageable rod coupling SK4 into two separating bodies TK1 and TK2. A first spring-elastic coupling $F_1$ having the spring rigidity $c_1$ is provided between the drive part SE11 and the intermediate member ZG or its first separating body TK1, and serves to transmit the tensile and compressive forces of the drive part SE11 onto the intermediate member ZG, for the sake of executing the normal raising and lowering motions of the entire control member or assembly SE within a first relative stroke $h_1$ as seen in FIGS. 21 and 22. In other words, the head 39 can move within the stroke $h_1$ counter to the force of a helical compression spring $F_{11}$, before an upper collar edge 40 travels over the distance $h_1$ to strike an oppositely disposed surface 41.1 of a stop ring 41. A disk spring assembly 43 is inserted between the stop ring and a conical sleeve 42, and a disk spring assembly 45 is likewise inserted between the lower flange 39.1 of the head 39 and a bottom 44.1 of a hollow 44. The conical sleeve 42 is welded to the sheath-like wall of the first separating body TK1. Accordingly, if the stroke $h_1$ is exceeded because of an accelerated upward motion of the drive part SE11 in the event of accidental leakage, a rigid coupling ensues between the head 39 and the first intermediate member part ZGT1 through the first separating body TK1. The first intermediate member part ZGT1 is accordingly spring-elastically coupled by the spring $F_1$ to the drive part SE11 and is rigidly couplable as a function of tensile force. It is constructed as an elongated transmission member, and is coupled through a second spring-elastic coupling $F_2$ having spring stiffness $c_2$ to the second intermediate member part ZGT2, with the latter being incorporated as a power take-off element into a force locking connection for the spinner part SE21. A force-locking connection is one which connects two elements together by force external to the elements, as opposed to a form-locking connection which is provided by the shapes of the elements themselves. The spring rigidity $c_1$ is less, and in particular substantially less, than the spring rigidity $c_2$. A prestressed disk spring assembly 46 is preferably used for the second resilient coupling $F_2$. If one looks at the elongated, rod-like second separating body TK2 of the first intermediate member part ZGT1, it can be seen that at its upper end the two coupling arms 18 and the coupling claws 18.1 and corresponding trapezoidal coupling protrusions engage correspondingly shaped trapezoidal recesses on the inner periphery of the first separating body TK1. The coupling arms 18 are followed by an appended solid middle part 47, which is provided with a central bore 48 being penetrated by a locking tappet 49 with a head 49.1 on one end and a blocking cone 49.2 on the other. The locking tappet 49 has a collar 49.3, and a restoring spring in the form of a helical compression spring 51 is introduced between the collar 49.3 and the bottom of a central cavity 50, which the coupling arms 18 surround. The spring 51 presses the blocking cone 49.2 of the locking tappet 49 into corresponding control surfaces 18.5 on the inner periphery of the coupling claws 18.1, thereby forcing these claws outward into coupling engagement with the first separating body TK1. Latch carrier bodies 52 are longitudinally displaceably supported and spring-loaded by a helical compression spring 53, in corresponding recesses at the solid middle part 47. The spring 53 is supported on a collar 54 of a hollow shaft 55 of the first intermediate member part ZGT1. The hollow shaft 55 is the continuation of the solid middle part 47. The lower end of the hollow shaft 55 has a further collar 56 firmly joined to it, which is in force-locking engagement with one end of the disk spring assembly 46. The other end of the disk spring assembly 46 is caught by an inner collar 57, which in turn is supported on a shoulder 58 on the inner periphery of the tubular second intermediate member part ZGT2. Blocking latches 290 are pivotably supported on the latch carrier body 52 through corresponding transverse-axis hinge pins 59. In the position shown in FIG. 16, protrusions 60 on the latch base have an annular collar 61 overlapping them, and a union nut 61.1 that has this annular collar 61 is screwed onto the upper end of the tubular second intermediate member part ZGT2 and welded to that end. It can be seen that once a rigid coupling between the head 39 of the drive part SE11 and the intermediate member ZG ensues, when the stroke $h_1$ is exceeded, the then-rigid coupling transmits substantially stronger forces to the lower end of the disk spring assembly 46, through the hollow shaft and the collar 56. As a result, the spring assembly is compressed by a second relative stroke $h_2$, which occurs between the first intermediate member part ZGT1 and the second intermediate member part ZGT2, and because of this relative motion the blocking latches 290 are compelled to move along with it into their extended position, which is shown in FIG. 20. The helical compression spring 53 is compressed in this process. The blocking latches 290 remain in their spread-apart position as shown in FIG. 20 as long as the increased tensile force prevails between the drive part SE11 and the intermediate member ZG. As already explained at the outset above, guide plates of the control members are disposed as stops in the path of motion of the spread-apart blocking latches 290. For the sake of simplicity, these guide plates are not shown in FIGS. 16 and 20.

If the blocking latches 290 run up against their stops, then the disengageable rod coupling SK4 is split, specifically into the first released separating body TK1 remaining with the drive part SE11, and the second separating body TK2 having a further motion which is blocked by the blocking latches 290. The locking tappet 49, which normally maintains the expanding coupling between the first and second separating bodies TK1, TK2, is supported on the second separating body and upon a third relative stroke $h_3$ between the second separating body TK2 and the latch carrier body 52 on one hand, and the second intermediate member part ZGT2 on the other, is carried along into an unlocking position, in which the coupling elements of the expanding coupling or disengageable rod coupling SK4 release the first separating body TK1. As noted, the third relative stroke $h_3$ is tripped whenever the spread-apart blocking latches 290 are fixed against further axial motion by the stops of the control member guide plates.

A protective sleeve 62 is also shown, which surrounds the coupling arms 18 and the blocking bolt or locking tappet 49 and is seated on an annular step of the reinforced middle part 47. In order to damp the impact when the blocking latches 290 strike the guide plate, a hollow deformation body 63 of ductile austenitic steel is secured to the lower end of the hollow shaft 55. In the event that upsetting occurs, the body 63 plunges into a conical opening 64 of the rod 65 leading to the spinner body 16. Some of the impact is absorbed by the restoring spring 53.

For the sake of clarity, the spring-elastic coupling of the helical spring 53 is symbolized by reference symbol $F_3$, and that of the helical spring 51 is symbolized by reference symbol $F_4$.

Figure 23:
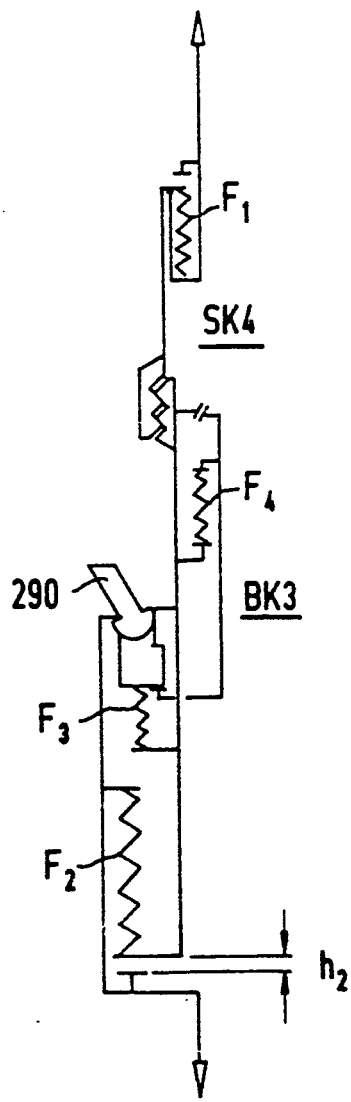
Figure 24:
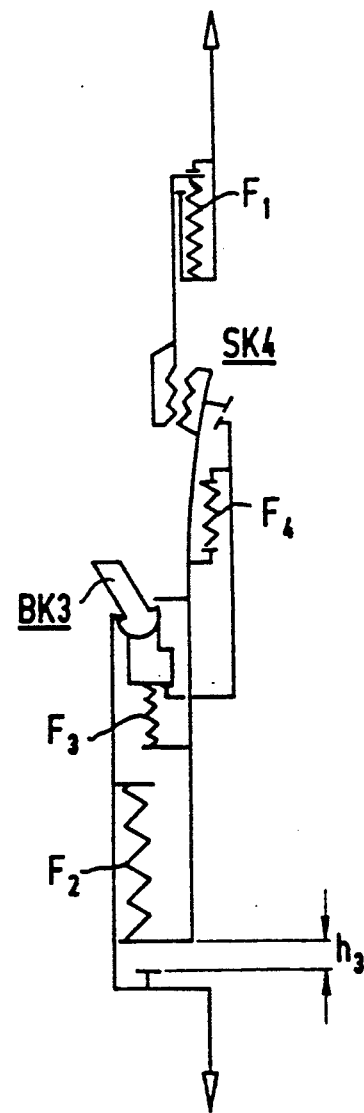

These symbols are used again in FIG. 21, which shows the position of repose of the antieject device of FIGS. 16–20. FIG. 22 shows an operating increment within the maximum operating stroke $h_1$. FIG. 23 shows that the stroke $h_1$, of 12 mm, for example, is far exceeded by the compression of the spring-elastic coupling $F_2$ by $h_2$, of 8.2 mm, for instance, and as a result a deflection of the blocking latches 290 has taken place. FIG. 24 shows that in addition to the maximum stroke $h_1$ of 12 mm, for example, a further stroke $h_3$ of 13.5 mm, for instance, then occurs, and the stroke is adequate to split apart the disengageable rod coupling or expanding coupling SK4.

Figure 25:
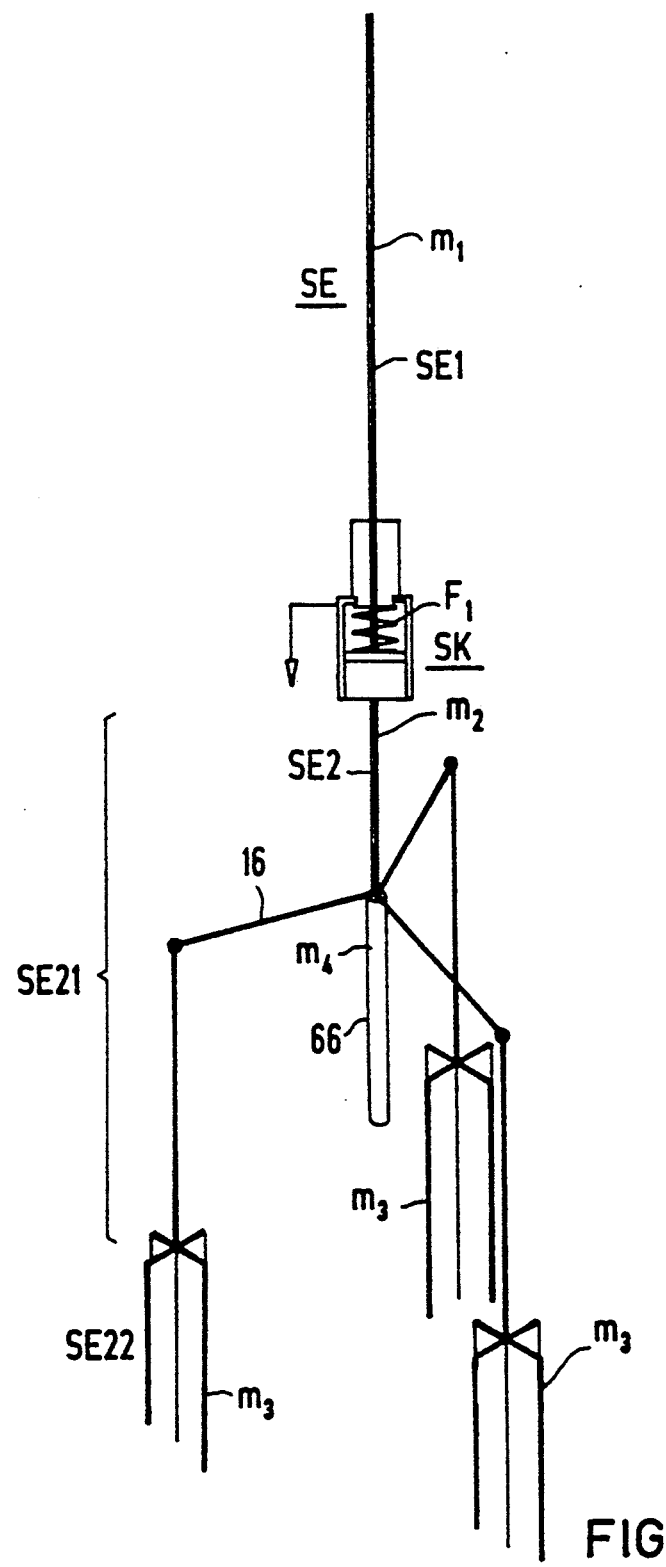
FIG. 25 is another schematic and partly perspective view of a suitable distribution of mass for an antieject device of FIGS. 16-24 in the case where the second control rod segment has a spinner with a plurality of absorber leaves.

FIG. 25 shows the distribution of mass for a control member SE and the resultant spring biasing for the first spring-elastic coupling $F_1$. The drawing figure also shows that it is suitable to provide a supplementary weight 66 having a mass $m_4 = 89$ kg, for instance, which is connected to the spinner part 16 and effects the accelerated lowering of the absorber part SE22 into the core once the lower control member segment SE2 has been disconnected by the disengageable rod coupling SK4 seen in FIG. 16. Further suitable dimensions of the control member SE are referred to in FIG. 25, where $m_1 = 25$ kg, for instance, represents the mass of the first control member segment, $m_2 = 70$ kg represents the mass of the second control member segment SE2 (without the masses $m_3$ and $m_4$), and $m_3 = 60$ kg represents the mass of the three inner absorber parts SE22.

The conical outer surface of the sleeve 42 of FIG. 16 can be used to perform cold welding, if these conical outer surfaces meet the conical inner surfaces of the "cap" 2.1 seen in FIGS. 1 and 2, specifically whenever the drive part SE11 of the first control member segment SE, in the case of a connection leakage, is accelerated to a certain speed having a kinetic energy which is adequate for the cold welding. In this way, the undesirable leak can be sealed off until the core reactor has cooled down and repairs can be begun.

We claim:

1. In a nuclear reactor including a pressure vessel with a wall enclosing a pressure vessel plenum, a core in the pressure vessel, a pressure-tight encapsulation in the wall communicating with the pressure vessel plenum, rod-like control members passing through the encapsulation and having first and second control member segments, the second control member segment having an absorber part to be at least partly inserted into and retracted out of the core for controlling reactivity, and a control drive, the first control member segment having an outer drive part inside the encapsulation for bringing the control member into interaction with the control drive for adjusting the control member along the longitudinal direction thereof, an antieject device for restraining ejection of the first control member segment of the control member being accelerated by differential pressure forces engaging the control member and seeking to force the control member out of the pressure vessel due to an accidental leak at the encapsulation, comprising, a rod coupling having a disengageable coupling catch interconnecting the first and second control member segments and remaining in engagement during normal control motion of the control member, said rod coupling having means for unlocking said coupling catch by responding and releasing said rod coupling if one of an upper limit value of a leakage-dependent differential pressure and a variable analogous to the differential pressure is reached between the pressure vessel plenum and the accidental leak at the encapsulation, and after disconnection said second control member segment and said absorber part remaining in the core for assuming a position fully inserted into the core, and wherein said disengageable rod coupling is a claw coupling having a central longitudinal coupling axis and coupling arms extending axially parallel with respect to the central longitudinal coupling axis, said coupling arms being radially inwardly and outwardly deflectably supported on the second control member segment and said coupling arms having ends with coupling claws, said coupling claws having coupling protrusions with trapezoidal cross sections engaging correspondingly shaped recesses of a coupling hollow formed in the first control member segment, and said coupling catch including a locking tappet being longitudinally displaceably supported along the central longitudinal coupling axis and spring loaded in the first control member segment, said tappet reaching between said coupling claws and maintaining said coupling protrusions in said recesses in a locked position, and said tappet being retracted out of the axial vicinity of said coupling claws in an unlocked position.

2. Device according to claim 1, including a cylinder chamber with a bottom wall in the first control member segment, a check piston being longitudinally displaceably supported in said cylinder chamber, a restoring spring biasing said check piston in a restoring direction in said cylinder chamber, said check piston having an end facing away from said restoring spring, said locking tappet being seated on said check piston, said locking tappet extending through an opening formed in said bottom wall between said coupling claws, and said end of said check piston communicating through a wall channel formed in the first control member segment with the pressure vessel plenum, for axially displacing said check piston counter to the force of said restoring spring and pulling said locking tappet into the unlocked position if the limit value of the leakage-dependent differential pressure is reached.

3. Device according to claim 2, including blocking latches being inwardly and outwardly deflectably supported in a path of motion on the second control member segment in the vicinity of said rod coupling, and a control member guide plate limiting the path of motion of said blocking latches, said blocking latches moving out of the circumferential contour of the second control member segment and preventing a retracting motion of the second control member segment upon attainment of one of an upper limit value of the leakage-dependent differential pressure and a variable analogous to the differential pressure, by striking against said control member guide plate.

4. Device according to claim 3, including control devices being outwardly deflectably supported on the second control member segment and having control surfaces meshing with said blocking latches, and said control devices being coupled for motion with said locking tappet for outwardly deflecting said control devices and causing an extension of said blocking latches upon axial displacement of said locking tappet.

5. Device according to claim 3, wherein the second control member segment has transverse-axis link bolts, and said blocking latches are pivotable in and out about said transverse-axis link bolts.

6. Device according to claim 4, wherein said control devices are extensions of said coupling arms having free ends, said coupling arms have pivot axes, said blocking latches are pivotably connected to said free ends of said extensions, and said blocking latches are carried along into a blocking position by said extensions being radially outwardly deflected about the pivot axes of said coupling arms upon a tripping motion of said coupling arms when said coupling claws of said coupling arms meet in an extended position of said locking tappet.

7. Device according to claim 3, including a locking piston having an interior and an outer top region, said locking piston being deflectable coaxially with and counter to said check piston for controlling said blocking latches in the second control member segment and being spring-loaded in a restoring direction, said locking piston having a hollow piston rod penetrating said locking tappet of said check piston and carrying a low internal pressure $p_2$ in the case of a leakage accident to the interior of said locking piston, said locking piston having an outer pressure $p_1$ bearing on the outer top region of said locking piston and being equivalent to the pressure of the pressure vessel plenum, where $p_2 < < p_1$, and the differential pressure $\Delta p = p_2 - p_1$, and said piston rod of said locking piston having control cams moving said blocking latches in engagement with said control cams outwardly into a blocking position upon attainment of the limit value of the differential pressure and axial displacement of said locking piston.

8. In a nuclear reactor including a pressure vessel with a lid and an interior, envelopes pressure-tightly connected to the pressure vessel and communicating with the interior thereof, a core with a core structure being disposed in the pressure vessel, fuel assemblies disposed in the core structure and defining vertical longitudinal channels between the fuel assemblies; and rod-like control members each passing pressure-tightly through the lid and having a part protruding to the outside being surrounded by a respective one of the envelopes;

each of the control members having a first control member segment, a drive part, a second control member segment, a spinner part of the second control member segment, and a lower absorber part of the second control member segment adjoining the spinner part; and the absorber part being at least partly insertable into and at least partly retractable out of the longitudinal channels for varying reactivity of the core;

an antieject device responding as a function of a pressure difference for blocking the control members against undesirable ejection whenever pressure forces exceeding a limit value and resulting from a difference between an internal pressure vessel pressure and an outer pressure engage an affected control member as a result of leakage at an envelope, comprising an intermediate member resiliently coupling the drive part to the spinner part;

a first resilient coupling with a given spring rigidity being disposed between the drive part and said intermediate member for transmitting tensile and compressive forces of the drive part to said intermediate member for executing normal raising and lowering motions of a control member within a first relative stroke;

means for rigidly coupling the drive part and the intermediate member whenever a spring travel of said first resilient coupling exceeds the first relative stroke as a result of increasing tensile forces of the drive part;

said intermediate member having a first intermediate member part constructed as an elongated transmission member and a second intermediate member part being force-lockingly connected with the spinner part as a power take-off element, said first intermediate member part being spring-elastically coupled with the drive part and being rigidly coupled with the drive part as a function of tensile forces, a second resilient coupling with a spring rigidity being greater than said given spring rigidity coupling said first intermediate member part to said second intermediate member part;

a latch carrier being longitudinally displaceably supported and spring-loaded on said intermediate member and having blocking latches, said blocking latches being radially spread apart in a path of motion for outwardly deflecting said second resilient coupling upon a second relative stroke being effected as a function of tensile force of said first intermediate member part relative to said second intermediate member part and remaining spread apart as long as an increased tensile force prevails between the drive part and said intermediate member;

guide plates disposed in the control members having stops in the path of motion of said spread-apart blocking latches;

a disengageable rod coupling in the form of an expanding coupling for splitting said first intermediate member part into a first released separating body remaining on the drive part and a second separating body to be blocked from further motion by said blocking latches, a locking tappet being supported on said second separating body, said locking tappet normally maintaining an expanded coupling between said first and second separating bodies and being carried along into an unlocking position upon a third relative stroke between said second separating body and both said latch carrier and said second intermediate member part, said expanding coupling having coupling elements releasing said first separating body in the unlocking position, and the third relative stroke being tripped whenever said spread-apart blocking latches are restrained from further axial motion by said stops of said guide plates.

9. In a nuclear reactor including a pressure vessel enclosing a plenum, a core in the pressure vessel, a pressure-tight encapsulation in the pressure vessel communicating with the plenum, control members passing through the encapsulation and having first and second control member segments, the second control member segment having an absorber part to be at least partly inserted into and retracted out of the core for controlling reactivity, the first control member segment having an outer drive part, and a control drive associated with the outer drive part for adjusting the control member along the longitudinal direction thereof, an antieject device for restraining ejection of the control member out of the pressure vessel due to differential pressure forces engaging the control member and seeking to force the control member out of the pressure vessel due to a leak at the encapsulation, comprising a rod coupling having a disengageable coupling catch interconnecting the first and second control member segments and remaining in engagement during normal control motion of the control member and means for unlocking said coupling catch upon a predetermined pressure difference between the pressure at the pressure vessel plenum and the pressure at the encapsulation, and after disconnection said second control member segment and said absorber part remaining in the core for assuming a position fully inserted into the core, and wherein said disengageable rod coupling is a claw coupling having a central longitudinal coupling axis and coupling arms extending axially parallel with respect to the central longitudinal coupling axis, said coupling arms being radially inwardly and outwardly deflectably supported on the second control member segment and said coupling arms having ends with coupling claws, said coupling claws having coupling protrusions with trapezoidal cross sections engaging correspondingly shaped recesses of a coupling hollow formed in the first control member segment, and said coupling catch including a locking tappet being longitudinally displaceably supported along the central longitudinal coupling axis and spring loaded in the first control member segment, said tappet reaching between said coupling claws and maintaining said coupling protrusions in said recesses in a locked position, and said tappet being retracted out of the axial vicinity of said coupling claws in an unlocked position.

* * * * *